(12) United States Patent
Lee

(10) Patent No.: US 12,502,448 B2
(45) Date of Patent: Dec. 23, 2025

(54) DISINFECTION DEVICE

(71) Applicants: HYUNDAI MOTOR COMPANY, Seoul (KR); KIA CORPORATION, Seoul (KR)

(72) Inventor: Jae Seung Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 479 days.

(21) Appl. No.: 18/071,808

(22) Filed: Nov. 30, 2022

(65) Prior Publication Data
US 2023/0321299 A1 Oct. 12, 2023

(30) Foreign Application Priority Data
Apr. 6, 2022 (KR) .................... 10-2022-0042595

(51) Int. Cl.
*A61L 2/26* (2006.01)
*A61L 2/10* (2006.01)

(52) U.S. Cl.
CPC ......... *A61L 2/26* (2013.01); *A61L 2/10* (2013.01); *A61L 2202/11* (2013.01); *A61L 2202/25* (2013.01)

(58) Field of Classification Search
None
See application file for complete search history.

(56) References Cited

U.S. PATENT DOCUMENTS

| | | |
|---|---|---|
| 10,893,990 B1 | 1/2021 | Uda |
| 2021/0393823 A1 | 12/2021 | Childress et al. |
| 2021/0393824 A1 | 12/2021 | Childress |
| 2021/0402936 A1 | 12/2021 | Mann et al. |
| 2022/0031882 A1* | 2/2022 | Dreffs ............... B25J 11/0085 |
| 2022/0080065 A1* | 3/2022 | Krosney ............ B01D 46/0028 |

FOREIGN PATENT DOCUMENTS

KR 10-2021-0153792 A 12/2021

* cited by examiner

*Primary Examiner* — Andrew Smyth
(74) *Attorney, Agent, or Firm* — Morgan Lewis & Bockius LLP

(57) ABSTRACT

A disinfection device includes at least two disinfection units movable into an unfolded position for operation thereof, the at least two disinfection units including a first disinfection unit and a second disinfection unit, and each of the disinfection units including a light source for disinfection, and a base configured to provide a moving force to the disinfection units.

19 Claims, 15 Drawing Sheets

DISINFECTION DEVICE

CROSS-REFERENCE TO RELATED APPLICATION

The present application claims priority to Korean Patent Application No. 10-2022-0042595, filed on Apr. 6, 2022, the entire contents of which is incorporated herein for all purposes by this reference.

BACKGROUND OF THE PRESENT DISCLOSURE

Field of the Present Disclosure

The present disclosure relates to a disinfection device, and more particularly, to an ultraviolet disinfection device.

Description of Related Art

Ultraviolet (UV) light has come to be used for disinfection because UV promotes chemical reactions, oxidizes organic matter, and kills microorganisms. Ultraviolet light includes UV-C light in the wavelength range of 200 nm (nanometer) to 280 nm, UV-B light in the range of 280 nm to 315 nm, and UV-A light in the range of 315 nm to 400 nm. Among them, UV-C light, which has a bactericidal action, is known to kill bacteria by denaturing deoxyribonucleic acid (DNA) when radiated thereon, disrupting regenerative and reproductive processes.

Recently, interest in hygiene and disinfection has increased more than ever, especially due to the coronavirus pandemic. Because it has been reported that UV-C may act as a countermeasure against coronavirus, products having UV-C light emitting diodes (LED) to kill coronavirus have also appeared.

Accordingly, due to the increasing interest in hygiene, various attempts are also being made to apply a UV disinfection device for disinfection within the interior of a vehicle, which is an enclosed space.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a disinfection device having improved disinfection performance.

Furthermore, the present disclosure is to provide a disinfection device capable of disinfecting the interior of a space in all directions.

The objects of the present disclosure are not limited to the above-mentioned objects, and other objects not mentioned will be clearly understood by those of ordinary skill in the art to which an exemplary embodiment of the present disclosure pertains (hereinafter, "those skilled in the art") based on the description below.

Various aspects of the present disclosure are directed to providing a disinfection device including at least two disinfection units movable into an unfolded position for operation thereof, the at least two disinfection units including a first disinfection unit and a second disinfection unit, and each of the disinfection units including a light source for disinfection, and a base configured to provide moving force to the disinfection units.

Other aspects and exemplary embodiments of the present disclosure are discussed infra.

It is to be understood that the term "vehicle" or "vehicular" or other similar term as used herein is inclusive of motor vehicles in general, such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

Figure 1A:
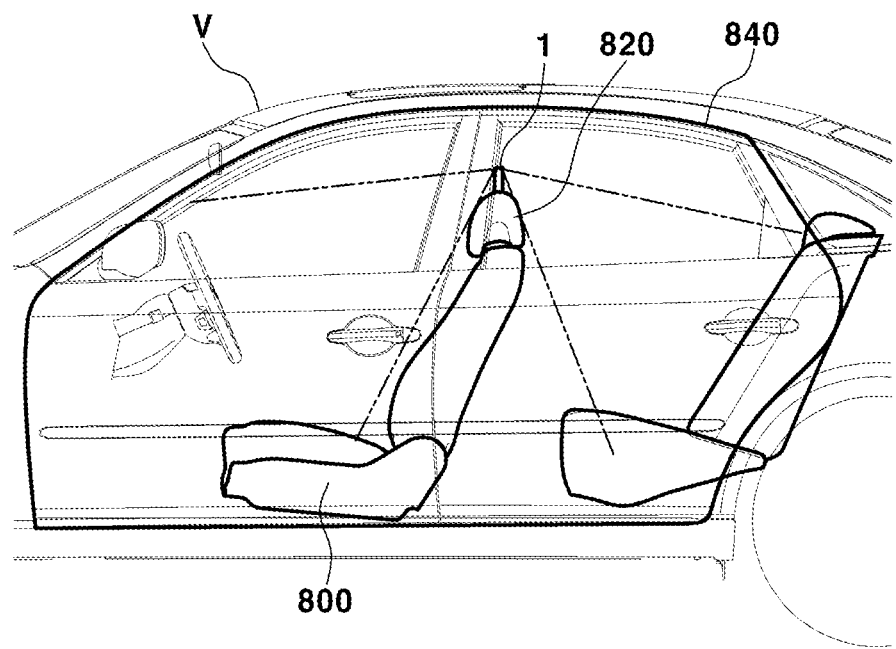
FIG. 1A illustrates an exemplary mounting position of a disinfection device according to an exemplary embodiment of the present disclosure.

It may be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Descriptions of specific structures or functions presented in the exemplary embodiments of the present disclosure are merely exemplary for explaining the exemplary embodiments according to the concept of the present disclosure, and the exemplary embodiments according to the concept of the present disclosure may be implemented in various forms. Furthermore, the descriptions should not be construed as being limited to the exemplary embodiments described herein, and should be understood to include all modifications, equivalents and substitutes falling within the idea and scope of the present disclosure.

Meanwhile, in an exemplary embodiment of the present disclosure, terms such as "first" and/or "second" may be used to describe various components, but the components are not limited to the terms. These terms are only used to distinguish one component from another. For example, a first component could be termed a second component, and similarly, a second component could be termed a first component, without departing from the scope of exemplary embodiments of the present disclosure.

It will be understood that when an element is referred to as being "connected with" another element, the element can be directly connected to another element, or intervening elements may also be present. In contrast, when a component is referred to as being "directly connected to" another component, there are no intervening components present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments, and is not intended to limit the present disclosure. In the present specification, the singular form includes the plural sense, unless otherwise specified. The terms "comprises" and/or "comprising" used in the present specification mean that the cited component, step, operation, and/or element does not exclude the presence or addition of one or more of other components, steps, operations, and/or elements.

Hereinafter, the present disclosure will be described in detail with reference to the accompanying drawings.

The present disclosure aims to provide a disinfection device configured to disinfect an enclosed internal space, particularly the interior of a vehicle. Because bacteria may exist anywhere that a person is capable of reaching within an enclosed space, the disinfection effect by a disinfection device must be able to reach various portions in the space.

Most disinfection devices applied to enclosed spaces, such as vehicles, are of a fixed type rather than a mobile type. For example, a disinfection device is fixed to a roof, seat, etc., of a vehicle. However, the intensity of a light source, such as an LED, decreases as the distance from the light source to the disinfection target increases or depending on the angle of radiation of the light, reducing disinfection performance. Accordingly, in case of a fixed-type disinfection device, the distance to the disinfection target may be large, so there are limits on the effectiveness of disinfection and on the range of the same.

For the present reason, various aspects of the present disclosure are directed to providing a rotatable disinfection device capable of thoroughly disinfecting the interior of an enclosed space.

Various aspects of the present disclosure are directed to providing maximum performance while occupying a small space using a disinfection device which is deployed from a folded position to an unfolded position for disinfection operation.

The disinfection device according to an exemplary embodiment of the present disclosure may be used in any indoor space where disinfection is needed. The use of the disinfection device according to an exemplary embodiment of the present disclosure may be more effective in disinfecting a limited space, such as the interior of a vehicle. Hereinafter, the case in which the disinfection device is provided in the interior of a vehicle will be described, but, as described above, the disinfection device may also be applied to any other space.

Figure 1B:
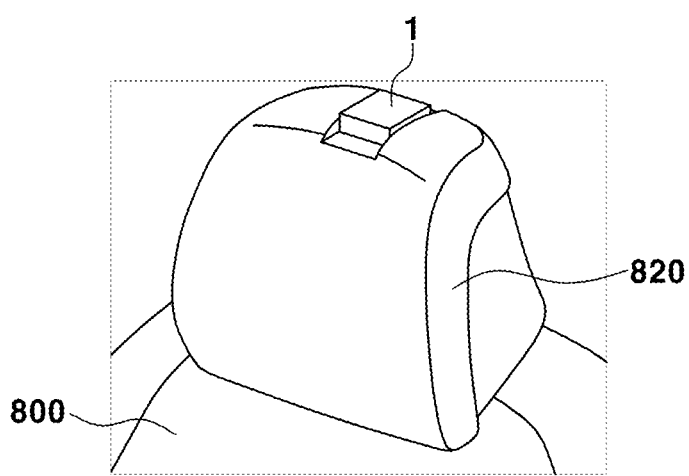
FIG. 1B is a partially enlarged perspective view of FIG. 1A.
Figure 1C:
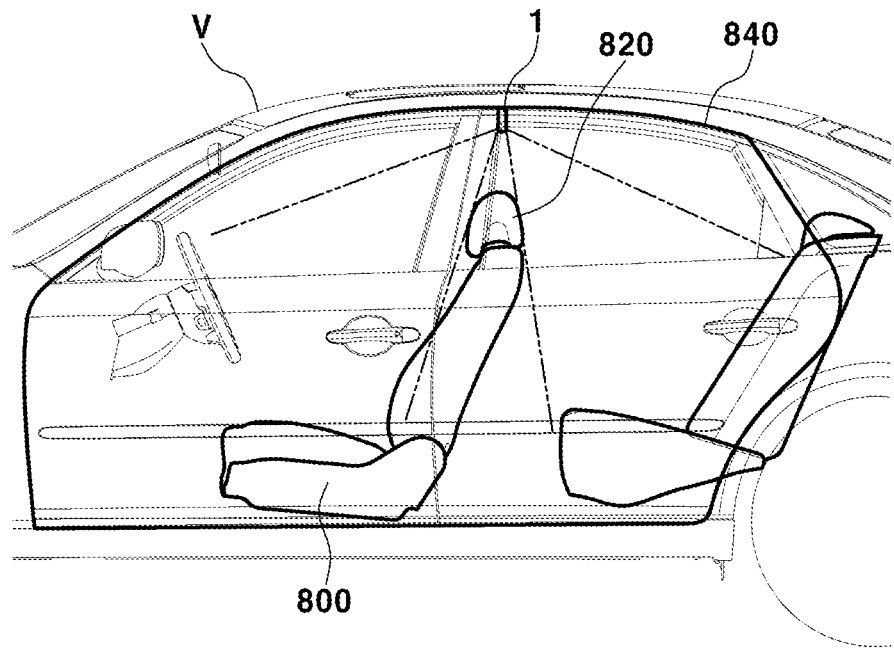
FIG. 1C illustrates an exemplary mounting position of a disinfection device according to an exemplary embodiment of the present disclosure.

A disinfection device 1 according to an exemplary embodiment of the present disclosure may be mounted at any position in the interior of a vehicle V. For example, the disinfection device 1 may be disposed at the upper portion of the vehicle interior, such as a roof, a headliner, an overhead console, or the like, or may be disposed at a predetermined height in the vehicle interior, such as on an armrest storage box. In various exemplary embodiments of the present disclosure, as illustrated in FIG. 1A and FIG. 1B, the disinfection device 1 according to an exemplary embodiment of the present disclosure may be mounted on a headrest 820 of a seat 800 in the interior of a vehicle V. In various exemplary embodiments of the present disclosure, as illustrated in FIG. 1C, the disinfection device 1 according to an exemplary embodiment of the present disclosure may be mounted on a roof 840 in the interior of a vehicle.

The disinfection device 1 according to an exemplary embodiment of the present disclosure may use a UV-C LED as a disinfection element. However, the present disclosure is not limited thereto, and other known light sources proven from the aspects of disinfection effectiveness and safety may be applied.

The disinfection device 1 according to an exemplary embodiment of the present disclosure is configured for being folded into a folded position in a non-operating state and a series of unfolded positions in an operating state. This will be described together with the operation of the disinfection device 1. The disinfection device 1 may include at least two disinfection units 300, 500, and the disinfection units 300, 500 may perform disinfection while moving from the folded position to the unfolded position through rotation or sliding movement.

For simplifying the description, among the two disinfection units 300, 500, a disinfection unit located at a relatively lower position in the drawing is referred to as a lower disinfection unit 300, and a disinfection unit located at a relatively upper position is referred to as an upper disinfection unit 500. However, in reality, the upper disinfection unit 500 may be positioned at a lower side in the direction of gravity and the lower disinfection unit 300 may be positioned at an upper side in the direction of gravity, depending on the design conditions. Furthermore, the upper disinfection unit 500 and the lower disinfection unit 300 may be arranged in the left and right direction thereof. Furthermore, in the present specification, the term "upper" in the upper disinfection unit 500 and the term "lower" in the lower disinfection unit 300 are used merely for distinguishing the upper disinfection unit 500 from the lower disinfection unit 300, and are not intended to designate a position.

Figure 2:
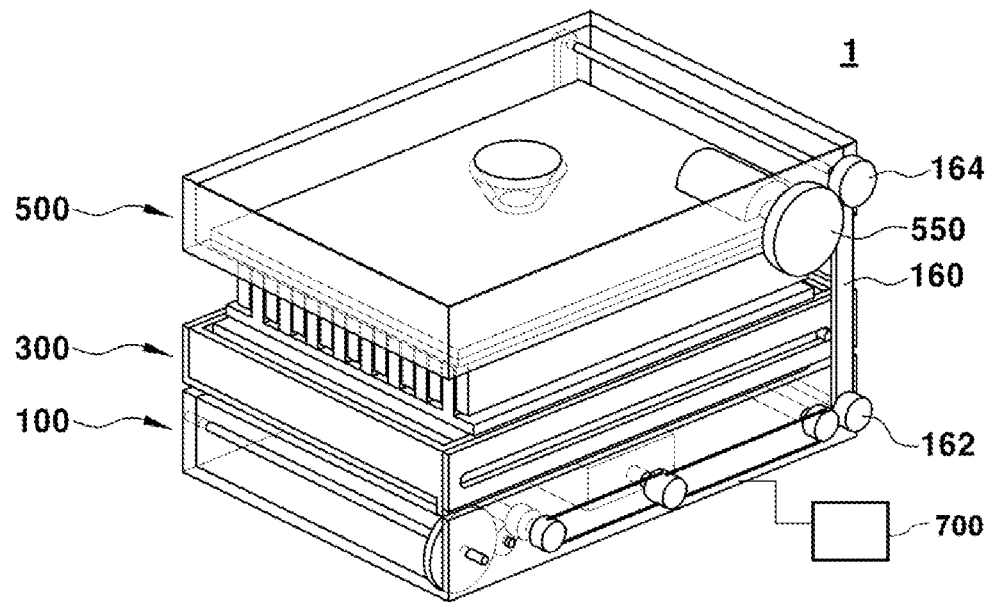
FIG. 2 is a perspective view of a disinfection device according to an exemplary embodiment of the present disclosure.
Figure 3:
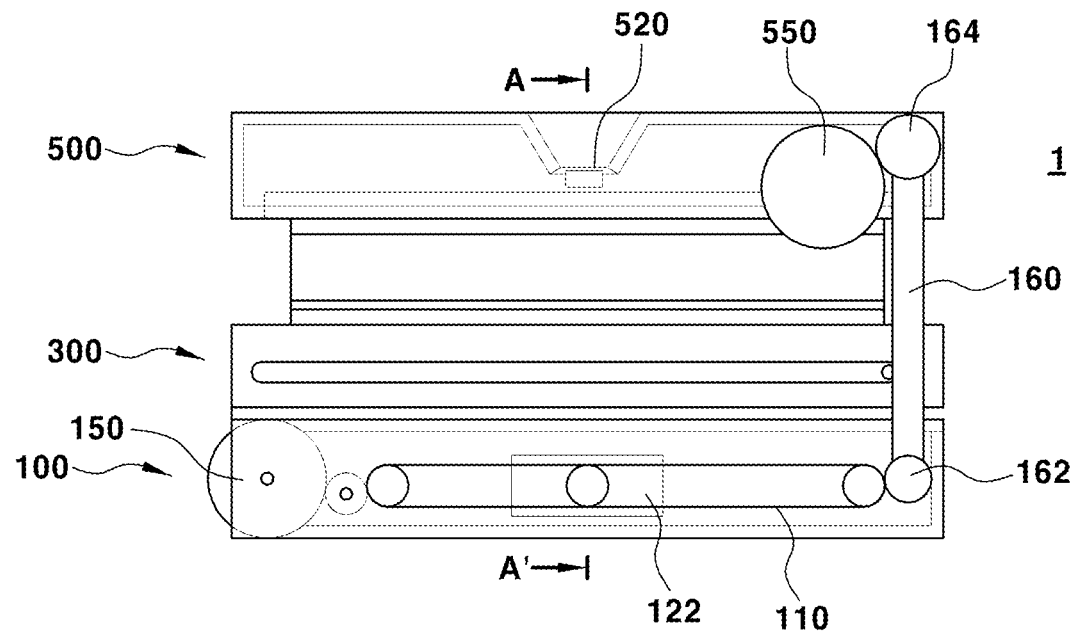
FIG. 3 is a front view of FIG. 2.
Figure 4:
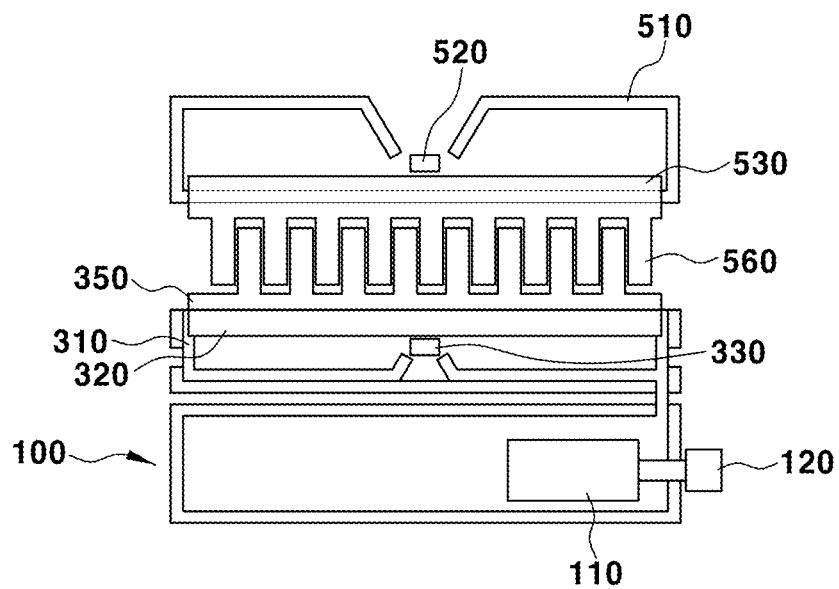
FIG. 4 is a sectional view taken along line A-A' of FIG. 3.

As illustrated in FIG. 2, FIG. 3 and FIG. 4, according to an exemplary embodiment of the present disclosure, the disinfection device 1 includes a base 100, the lower disinfection unit 300, and the upper disinfection unit 500. The base 100, the lower disinfection unit 300, and the upper disinfection unit 500 are disposed to overlap one another in the non-operating state or the folded position.

The base 100 allows the disinfection device 1 to be mounted on a subject to be provided. The base 100 includes driving elements for providing moving force to the lower disinfection unit 300 and the upper disinfection unit 500.

Figure 5A:
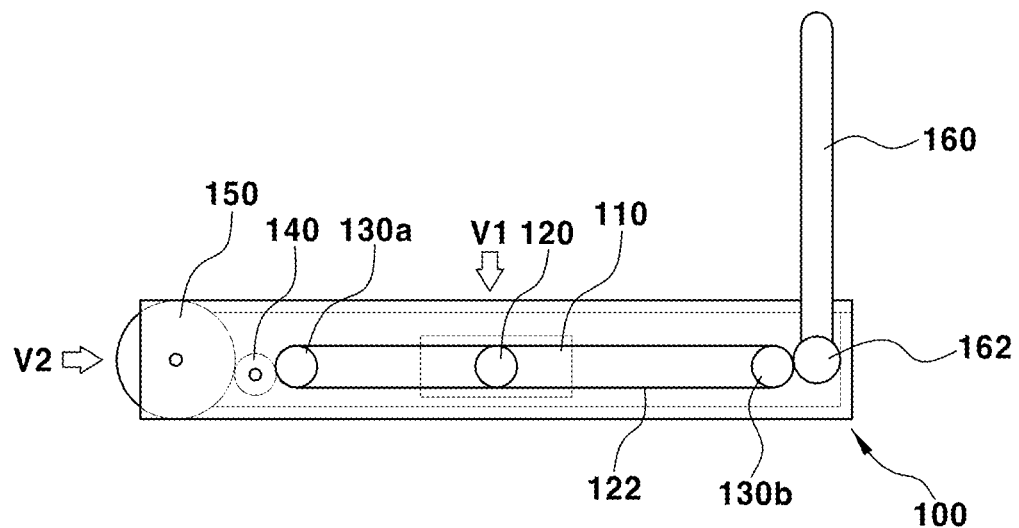
FIG. 5A is a front view of a base of a disinfection device according to various exemplary embodiments of the present disclosure.
Figure 5B:
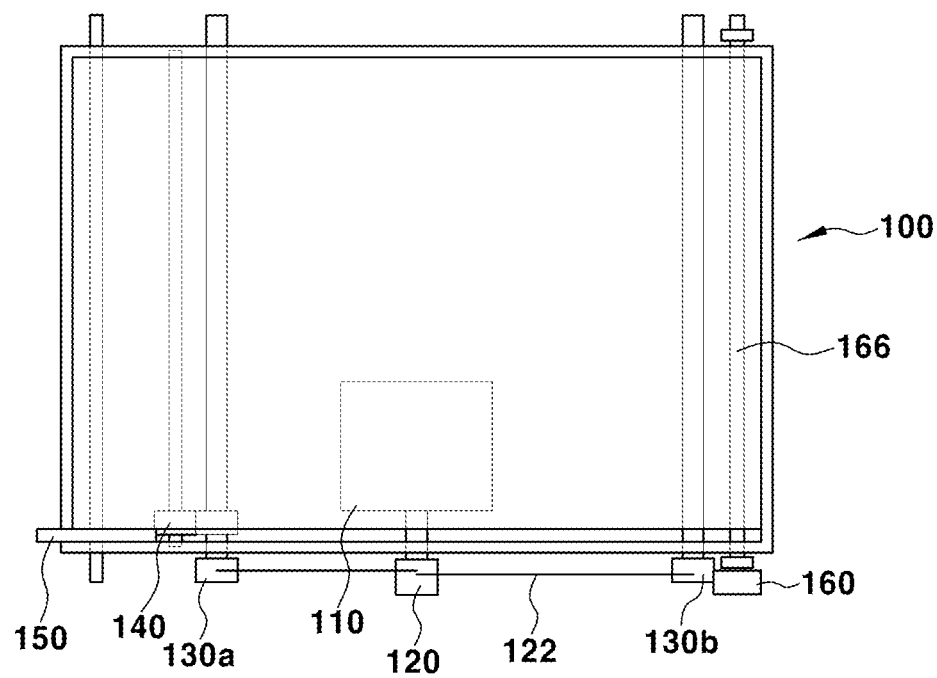
FIG. 5B illustrates a view from V1 of FIG. 5A.
Figure 5C:
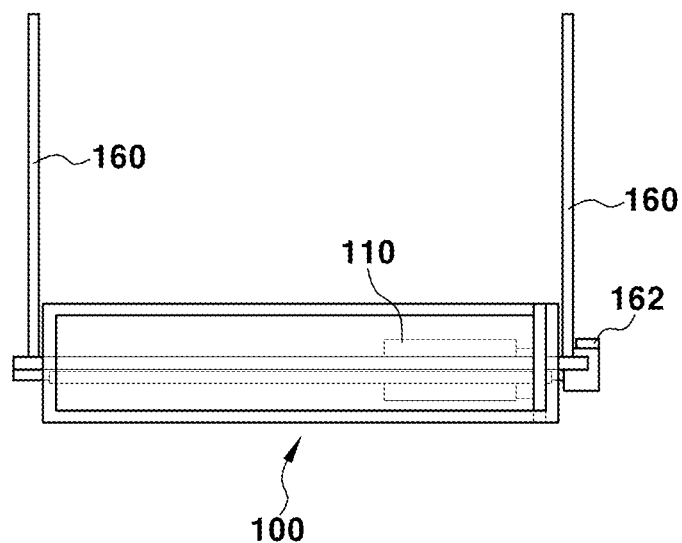
FIG. 5C illustrates a view from V2 of FIG. 5A.

Referring to FIG. 5A, FIG. 5B, and FIG. 5C, the base 100 includes a main motor 110. The main motor 110 may be accommodated in the base 100. The main motor 110 has a rotation shaft to which a main gear 120 is mounted. The main gear 120 is rotated by being driven by the main motor 110.

A belt 122 is mounted on a circumference of the main gear 120. The belt 122 is formed in the shape of a closed loop, and cooperative gears 130a, 130b are respectively disposed at opposite sides with respect to the main gear 120. When the main gear 120 is rotated by the driving of the main motor 110, rotation force is transmitted to each of the cooperative gears 130a, 130b through the belt 122.

The belt 122 is configured to transmit the rotation force to a transmission gear 140. The transmission gear 140 receives the rotation force by the belt 122 on the side of the cooperative gear 130a being one of the cooperative gears 130a, 130b. The transmission gear 140 is located on the side opposite a connecting rod 160 with respect to the main motor 110. Furthermore, the transmission gear 140 is configured to come into contact with a rotation gear 150. The transmission gear 140 transmits the rotation force from the belt 122 to the rotation gear 150. As will be described later, the rotation force of the rotation gear 150 is transmitted to the lower disinfection unit 300 which neighbors the base 100 so that the lower disinfection unit 300 slides.

Furthermore, the belt 122 is configured to provide the rotation force to the connecting rod 160. The connecting rod 160 receives the rotation force by the belt 122 on the side of the cooperative gear 130b being one of the cooperative gears 130a, 130b. The connecting rod 160 is located on the side opposite to the transmission gear 140 with respect to the main motor 110. The connecting rod 160 has an end portion, which is a first end portion 162, that comes into contact with the belt 122. The first end portion 162 has a circular or curved surface to allow the connecting rod 160 to rotate about the first end portion 162. The connecting rod 160 is connected to the upper disinfection unit 500 to rotate the upper disinfection unit 500, as will be described later. For example, the connecting rod 160 has a second end portion 164 connected to the upper disinfection unit 500.

Figure 6A:
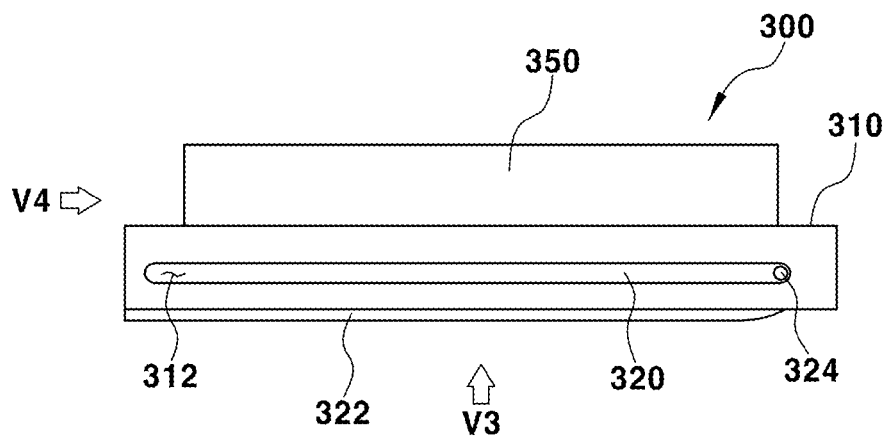
FIG. 6A is a front view of a lower disinfection unit of a disinfection device according to various exemplary embodiments of the present disclosure.
Figure 6B:
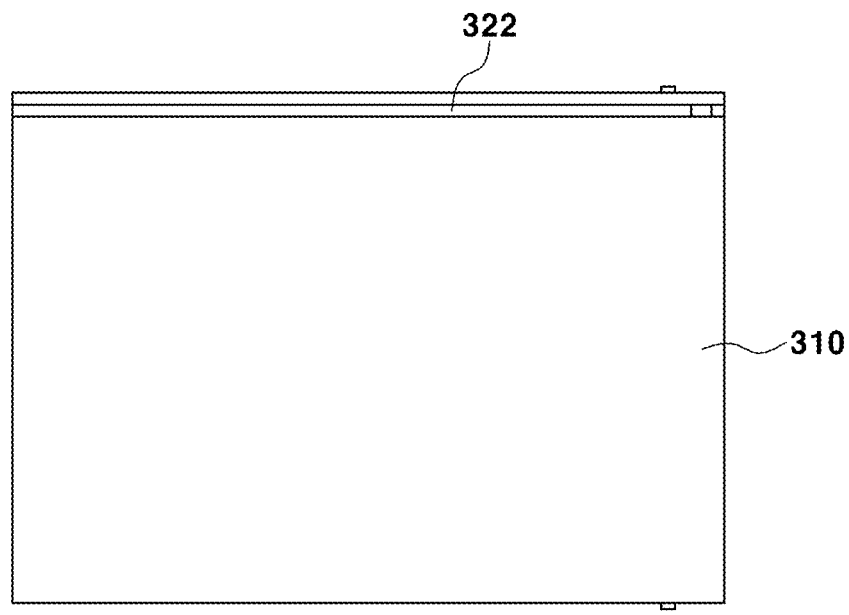
FIG. 6B illustrates a view from V3 of FIG. 6A.
Figure 6C:
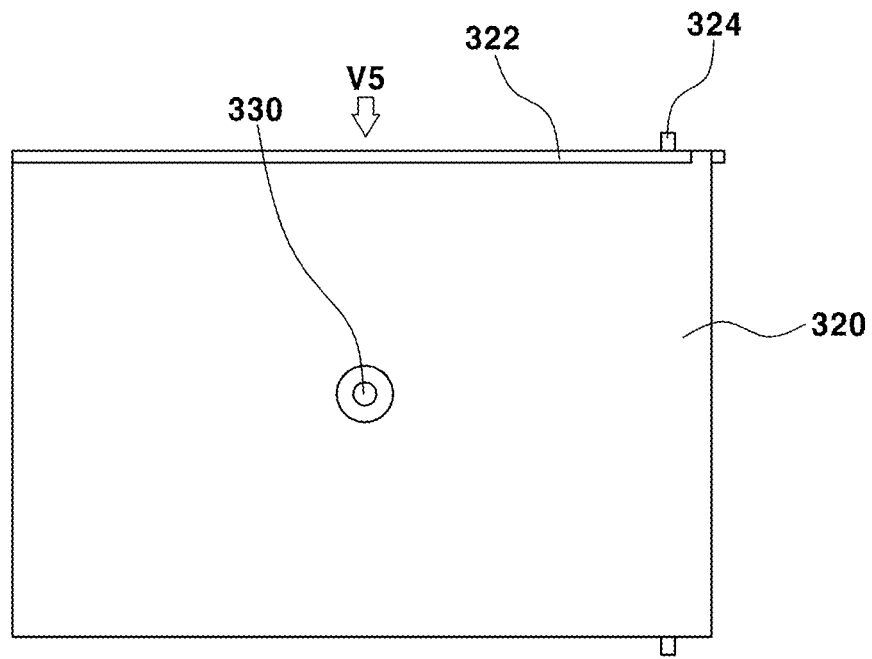
FIG. 6C illustrates a view from V3 of FIG. 6A in the state in which a frame is detached.

As illustrated in FIG. 6A, FIG. 6B, and FIG. 6C, the lower disinfection unit 300 includes a frame 310 and a housing 320. The housing 320 is accommodated inside the frame 310, and the housing 320 is configured to be movable with respect to the frame 310.

The housing 320 receives moving force from the rotation gear 150. To the present end, the housing 320 may be disposed to come into contact with the rotation gear 150. In various exemplary embodiments of the present disclosure, the housing 320 has a guide 322 moving along the rotation gear 150. When the rotation gear 150 rotates, the guide 322 in contact with the rotation gear 150 moves, allowing the housing 320 to be drawn to the external side of the frame 310.

The lower disinfection unit 300 includes a guide structure configured to guide the movement of the housing 320. In various exemplary embodiments of the present disclosure, the frame 310 has a slot 312. The slot 312 extends in the moving direction of the housing 320. The housing 320 is provided with a guide pin 324 that works in conjunction with the slot 312. The guide pin 324 is inserted into the slot 312 and moves along the slot 312.

Figure 6D:
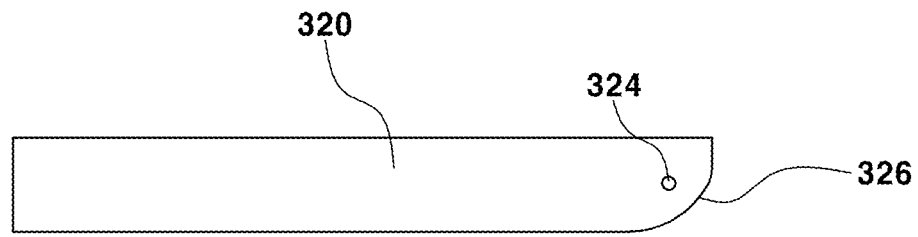
FIG. 6D illustrates a view from V5 of FIG. 6C.

As illustrated in FIG. 6D, the housing 320 has a curved portion 326. The curved portion 326 is formed around the guide pin 324. When the housing 320 is fully withdrawn from the frame 310 and constrained by the guide pin 324 in the slot 312 of the frame 310, the curved portion 326 enables the housing 320 to rotate along the curved portion 326.

The housing 320 has a lower light source 330 mounted thereto. The lower light source 330 may be a light for disinfection, and may be a UV-C LED. The lower light source 330 may be mounted on a lower printed circuit board 340 disposed inside the housing 320. Furthermore, the lower light source 330 may be disposed to emit light toward the base 100.

Figure 6E:
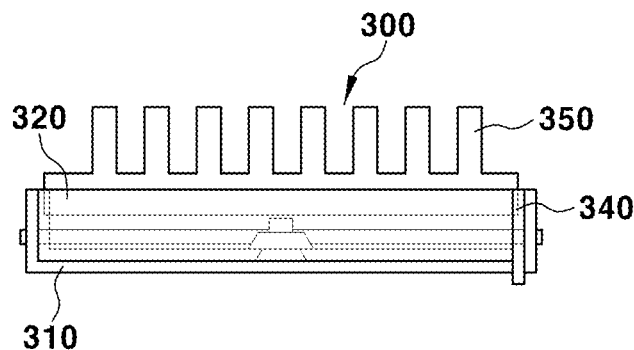
FIG. 6E illustrates a view from V4 of FIG. 6A.

As illustrated in FIG. 6E, the lower disinfection unit 300 is provided with a lower heat dissipation structure 350 in contact with the housing 320. The lower heat dissipation structure 350 is disposed between the upper disinfection unit 500 and the housing 320. In other words, the lower heat dissipation structure 350 may be disposed on a surface opposite to the surface from which the lower light source 330 emits light. The lower heat dissipation structure 350 allows the lower disinfection unit 300 to freely radiate heat.

Figure 7A:
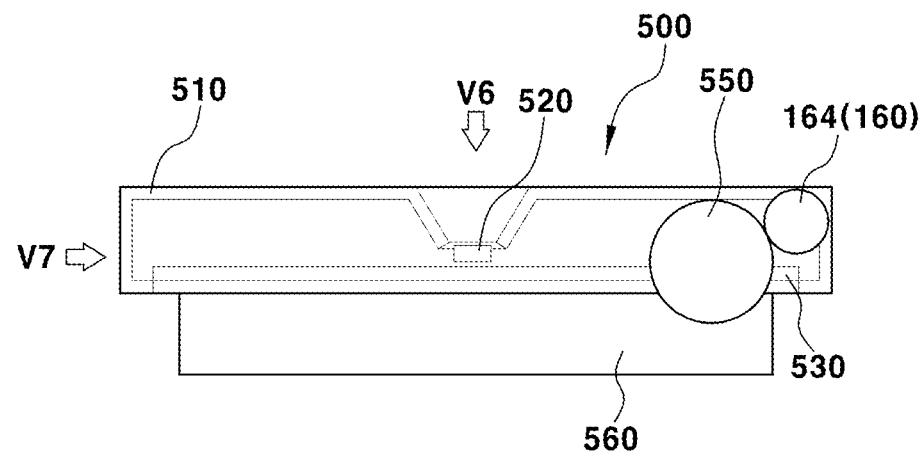
FIG. 7A is a front view of an upper disinfection unit of a disinfection device according to various exemplary embodiments of the present disclosure.
Figure 7B:
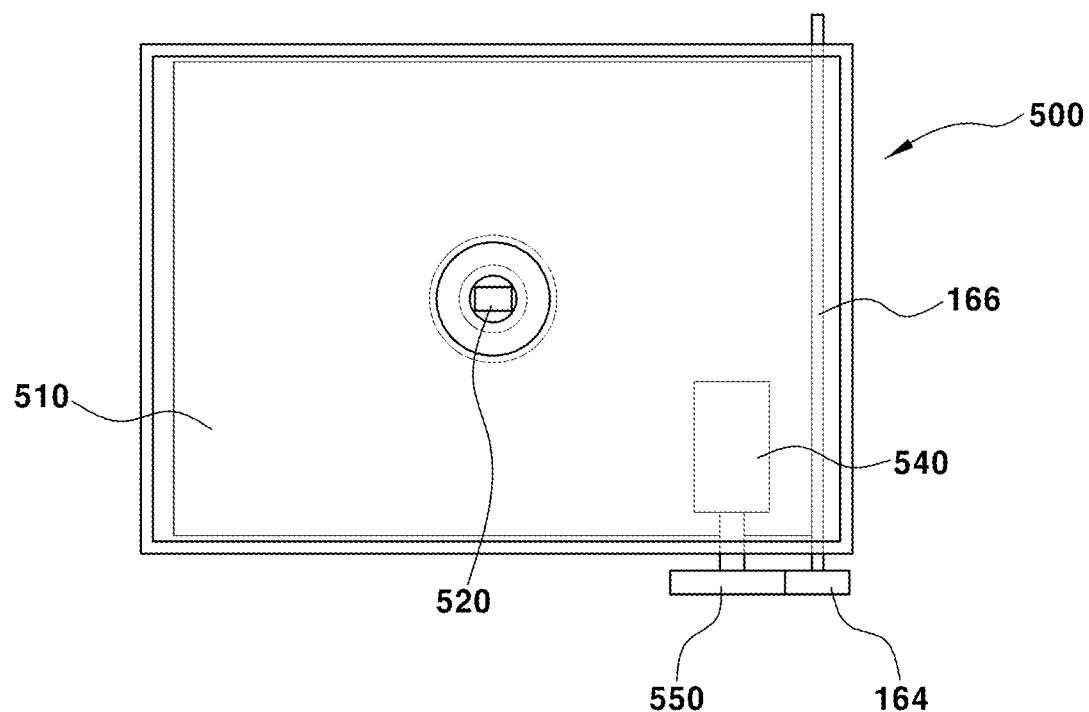
FIG. 7B illustrates a view from V6 of FIG. 7A.

As illustrated in FIG. 7A and FIG. 7B, the upper disinfection unit 500 includes a case 510. The case 510 is provided therein with an upper light source 520 for disinfection. The upper light source 520 may be a UV-C LED, like the lower light source 330 of the lower disinfection unit 300. Furthermore, the upper light source 520 may be mounted on an upper printed circuit board 530 provided inside the case 510. In various exemplary embodiments of the present disclosure, the upper light source 520 is disposed to face the direction opposite to the direction faced by the lower light source 330.

Referring back to FIG. 5A, the case 510 is configured to rotate about the first end portion 162 of the connecting rod 160 by the operation of the main motor 110. Because the second end portion 164 of the connecting rod 160 is connected to the case 510 and the first end portion 162 of the connecting rod 160 receives the rotation force from the belt 122 to rotate, the case 510 may rotate about the first end portion 162. Here, the second end portion 164 of the connecting rod 160 may be fixed to the case 510.

The upper disinfection unit 500 includes an assist motor 540. The assist motor 540 is accommodated in the case 510, and the assist motor 540 has a rotation shaft to which an assist gear 550 is mounted. The assist gear 550 is configured to be rotatably engaged with the second end portion 164 of the connecting rod 160. When the assist gear 550 rotates, the case 510 rotates about the second end portion 164 of the connecting rod 160 or about a central axis 166 of the second end portion 164. Because the upper disinfection unit 500 includes the assist motor 540 and the assist gear 550, the case 510 may be adjusted to various angles.

Figure 7C:
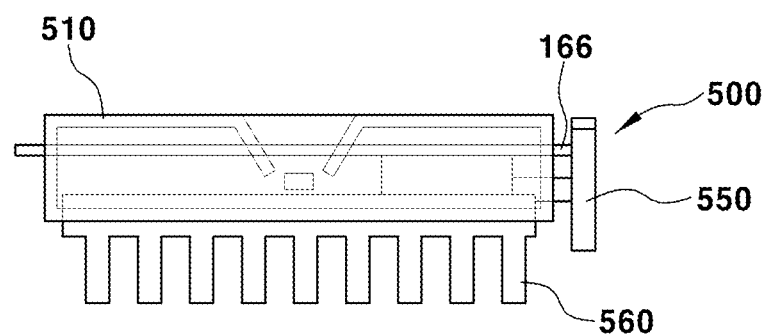
FIG. 7C illustrates a view from V7 of FIG. 7A.
Figure 8:
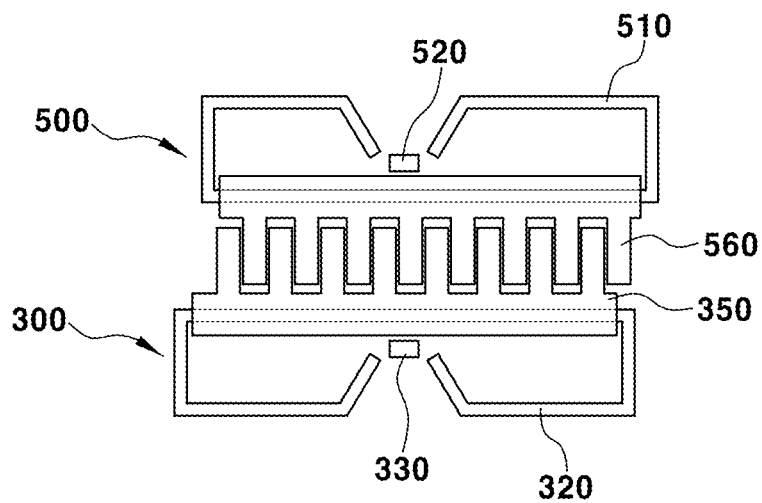
FIG. 8 illustrates a cross-sectional view of a disinfection device according to various exemplary embodiments of the present disclosure.

As illustrated in FIG. 7C, the upper disinfection unit 500 includes an upper heat dissipation structure 560, and the upper heat dissipation structure 560 is disposed to face the lower heat dissipation structure 350. In various exemplary embodiments of the present disclosure, as illustrated in FIG. 8, the upper heat dissipation structure 560 and the lower heat dissipation structure 350 are configured to engage with each other in the non-operating state or the folded position of the disinfection device 1. In various exemplary embodiments of the present disclosure, the upper heat dissipation structure 560 and the lower heat dissipation structure 350 may be congruent, but have a structure in which the upper heat dissipation structure 560 and the lower heat dissipation structure 350 are engaged with each other by offsetting the upper disinfection unit 500 from the lower disinfection unit 300 in the horizontal direction thereof. Such an overlapping arrangement of the heat dissipation structures 350, 560 may make it possible to slim the disinfection device 1.

Referring to FIGS. 9A to 9H, the operation of the disinfection device 1 according to an exemplary embodiment of the present disclosure will be described.

Figure 9A:
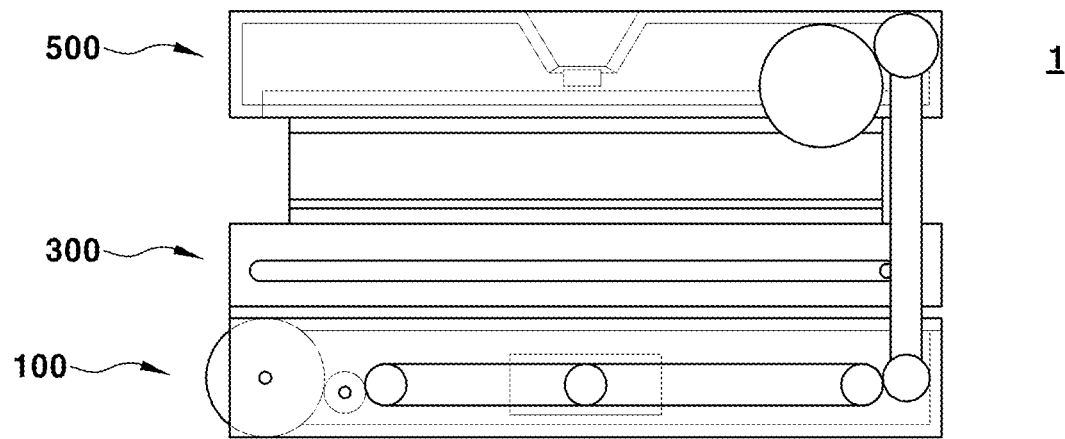
FIG. 9A illustrates a disinfection device in a folded position.

As illustrated in FIG. 9A, the disinfection device 1 is in the non-operating state. In other words, the base 100, the lower disinfection unit 300, and the upper disinfection unit 500 are in the folded position, in which they overlap one another.

Figure 9B:
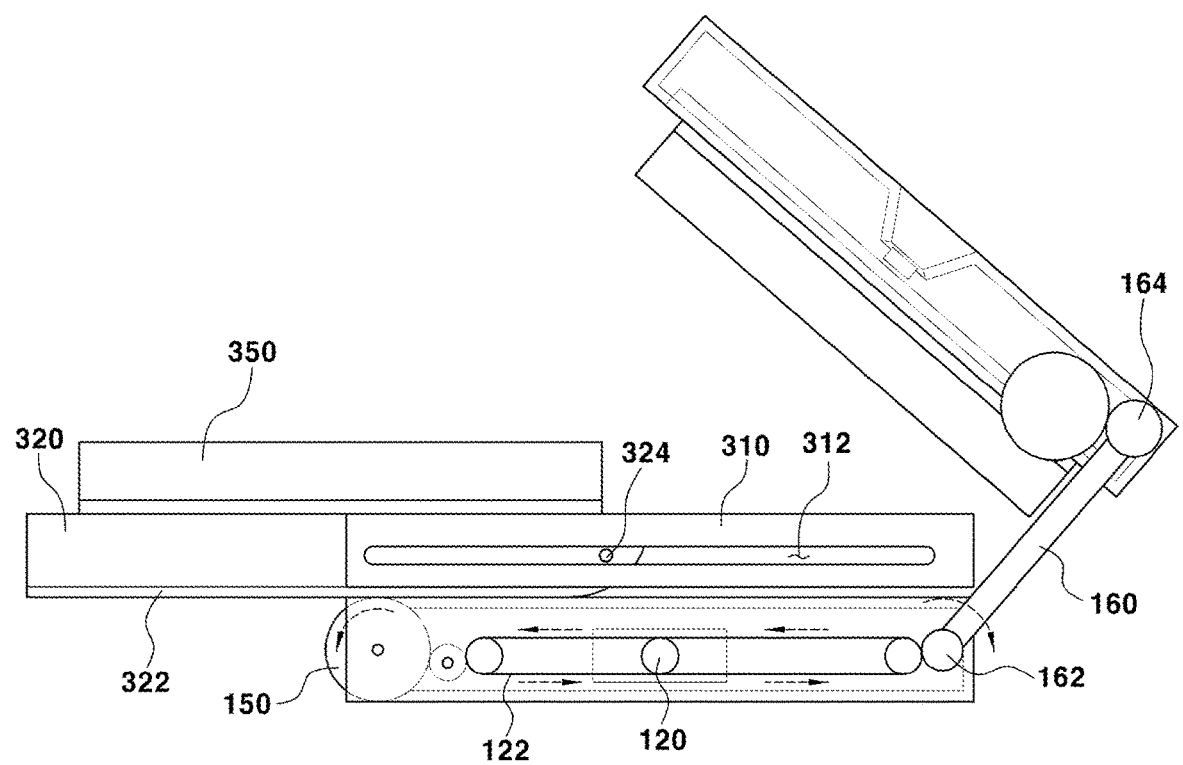
FIG. 9B illustrates the disinfection device moved from the folded position to any of a plurality of unfolded positions.

As illustrated in FIG. 9B, the operation of the disinfection device 1 commences. When the main motor 110 is driven, the belt 122 starts to rotate, as indicated by the arrow. Due to the rotation of the belt 122, the transmission gear 140 and the first end portion 162 of the connecting rod 160 rotate to move the disinfection device 1 to one of a series of unfolded positions.

In the lower disinfection unit 300, the rotation force is transmitted to the rotation gear 150 by the transmission gear 140. The housing 320 of the lower disinfection unit 300 receives moving force from the rotation gear 150 through the guide 322. At the instant time, the housing 320 of the lower disinfection unit 300 slides while being guided by the guide pin 324 inserted in the slot 312 of the frame 310.

In case of the upper disinfection unit 500, the first end portion 162 of the connecting rod 160 is rotated by the belt 122, after which the upper disinfection unit 500 connected to the first end portion 162 by the connecting rod 160 starts rotating about the first end portion 162 of the connecting rod 160.

Figure 9C:
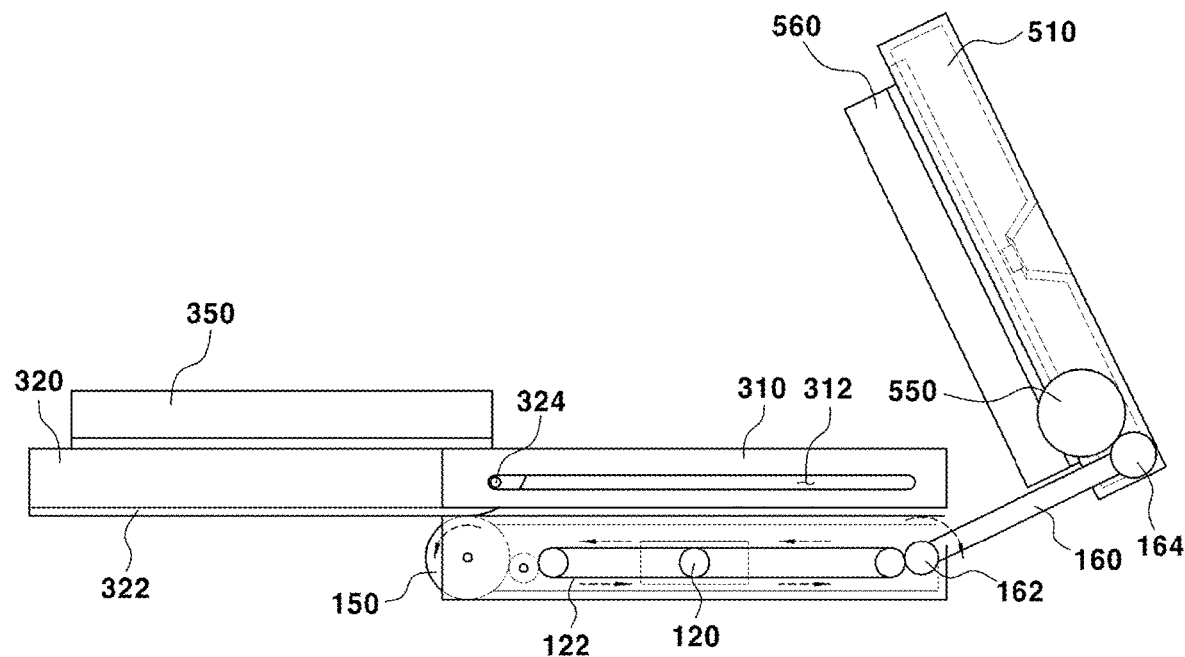
FIG. 9C illustrates the disinfection device moved to any other of the plurality of unfolded positions.
Figure 9D:
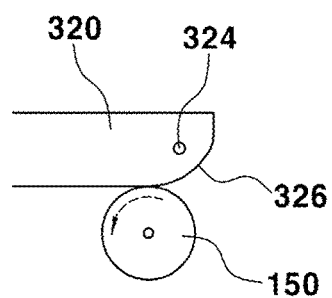
FIG. 9D and FIG. 9E are enlarged views of the portion indicated by the dashed line in FIG. 9C, illustrating rotation of a housing by a curved portion.
Figure 9E:
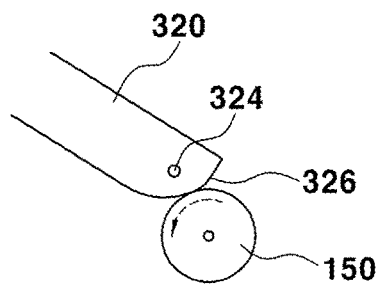

As illustrated in FIG. 9C, when the housing 320 is drawn out from the frame 310 and the guide pin 324 reaches the end portion of the slot 312, sliding movement of the housing 320 is terminated. However, as illustrated in FIG. 9D and FIG. 9E, rotation of the rotation gear 150 is not finished, so from the present point on, the rotation gear 150 comes into contact with the curved portion 326. Accordingly, the curved portion 326 is rotated by the rotation gear 150 about the guide pin 324. Due to the rotation of the rotation gear 150, the housing 320 rotates about the guide pin 324 to change the angle of the housing 320, expanding the range of disinfection performed by the lower light source 330.

Figure 9F:
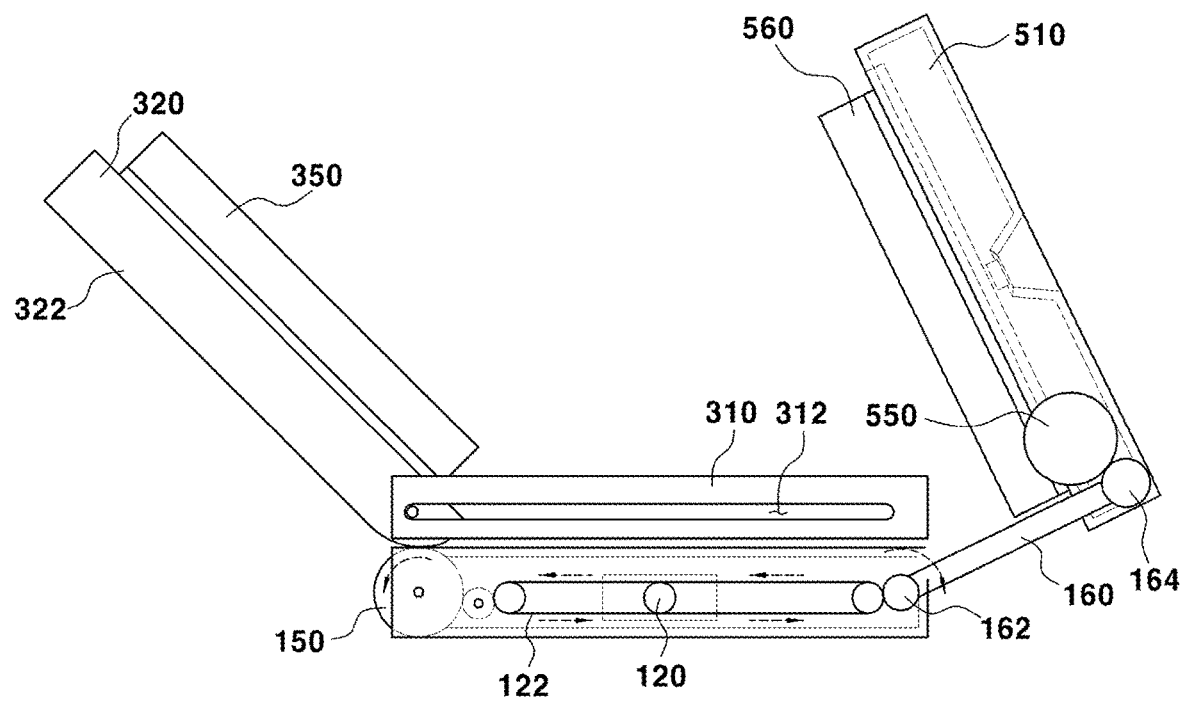
FIG. 9F illustrates the disinfection device moved to another one of the plurality of unfolded positions.

When the housing 320 finishes rotating along the curved portion 326, as illustrated in FIG. 9F, the disinfection device 1 is placed in another one of the unfolded positions. According to an exemplary embodiment of the present disclosure, at the present point, the assist motor 540 may be driven to change the angle of the upper disinfection unit 500 to secure a wider disinfection area.

Figure 9G:
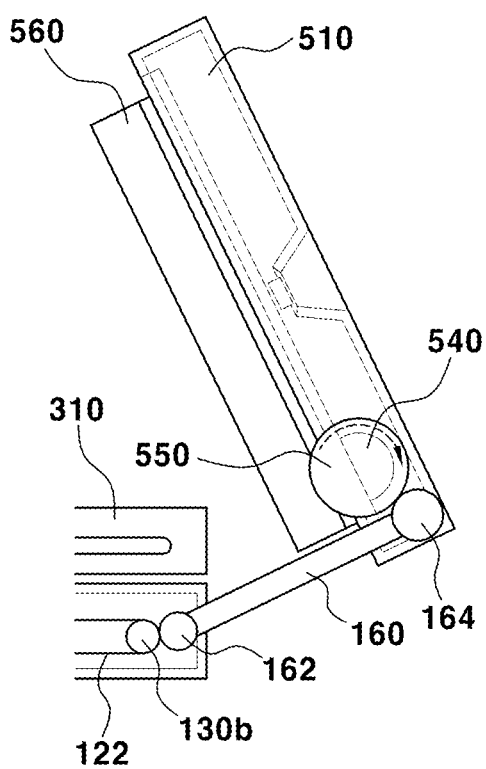
FIG. 9G and FIG. 9H each show the state in which the disinfection device moves to another one of the plurality of unfolded positions by the operation of an assist motor and an assist gear.
Figure 9H:
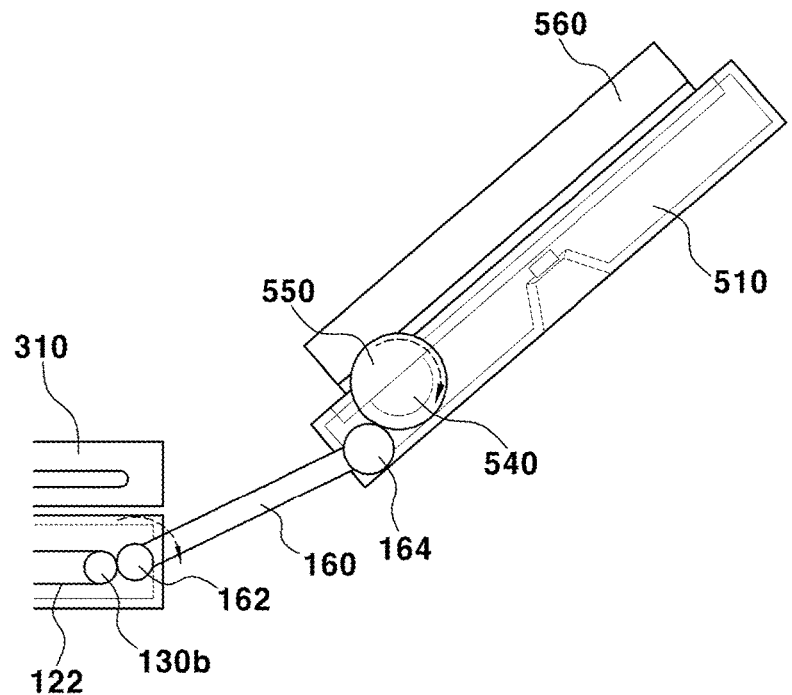

Referring to FIG. 9G and FIG. 9H, when the assist motor 540 is driven in the unfolded position of FIG. 9F, the assist gear 550 rotates. Then the assist gear 550 rotates about the second end portion 164 of the connecting rod 160 and the case 510 rotates about the central axis 166, changing the angle of the upper disinfection unit 500. The driving angle of the assist motor 540 may be changed to change the irradiation range of the upper light source 520.

Figure 10:
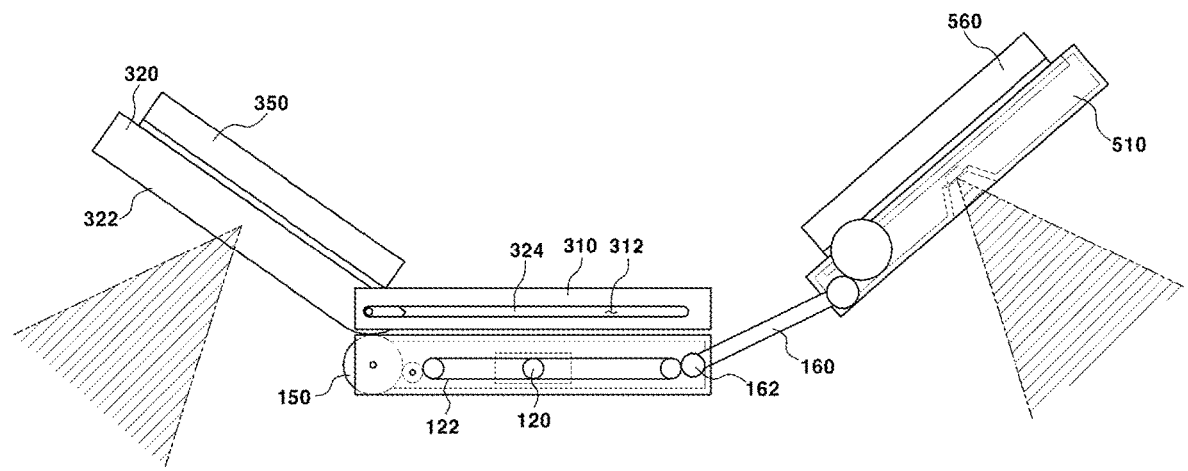
FIG. 10 illustrates the disinfection device moved to another one of the plurality of unfolded positions.

As illustrated in FIG. 10, in the state in which the disinfection device 1 is fully unfolded, the main motor 110 and the assist motor 540 may be controlled to operate each of the upper light source 520 and the lower light source 330 to disinfect all parts of the disinfection target space.

According to various exemplary embodiments of the present disclosure, the disinfection device 1 further includes a controller 700. The controller 700 may control the driving of the main motor 110, the assist motor 540, the lower light source 330, and the upper light source 520 based on a predetermined rotation angle, an operating time, and the like. The controller 700 may control, for example, the lower printed circuit board 340 and the upper printed circuit board 530 to thereby control the driving of the main motor 110, the assist motor 540, the lower light source 330, and the upper light source 520. Moreover, the controller 700 may communicate with the vehicle V to collect information on the current state of the vehicle.

Figure 11:
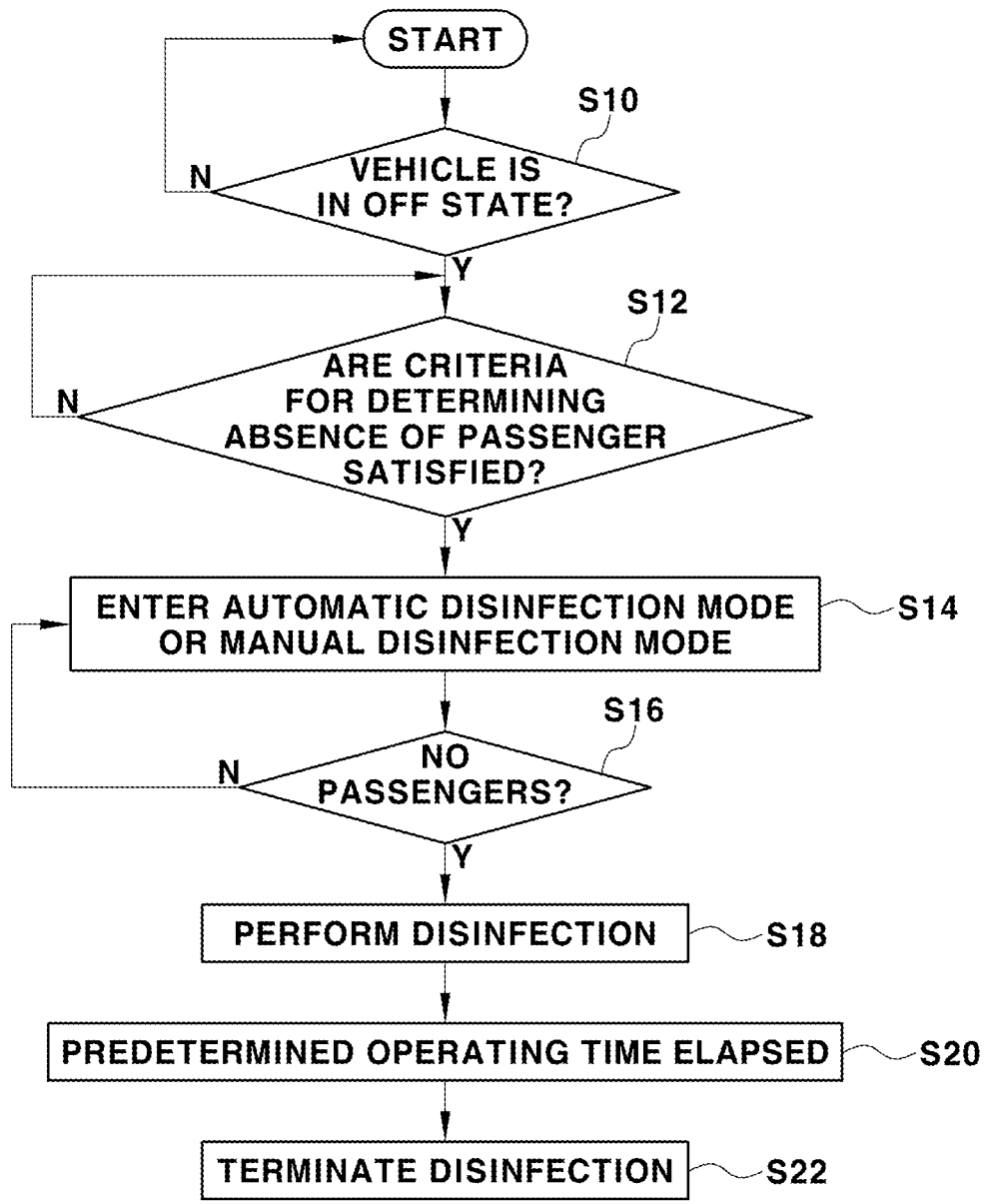
FIG. 11 shows an operation flow diagram of a disinfection device according to various exemplary embodiments of the present disclosure.

Referring to FIG. 11, the disinfection device 1 according to an exemplary embodiment of the present disclosure may be controlled as follows.

The controller 700 determines whether the vehicle V is in an OFF state in step S10. While the disinfection device 1 disinfects the interior of the vehicle, there should be no passengers in the vehicle, so that the controller 700 may perform a preliminary determination regarding the possibility of the presence of passengers based on the current situation in step S12. For example, when the ignition is turned off in a vehicle, the door of the vehicle V is automatically unlocked. When the door is automatically unlocked, then opened, closed, and locked, it may be assumed that passengers have exited the vehicle.

Accordingly, when the door is opened, closed and then locked after the ignition is turned off, the controller 700 may preliminarily determine that passengers have exited the vehicle V and then may enter an automatic disinfection mode for automatically performing disinfection according to a pre-stored command, or may enter a manual disinfection mode for performing disinfection in response to a request in step S14.

Regardless of whether entering the automatic disinfection mode or the manual disinfection mode, the controller 700 is configured to reliably determine the presence or absence of a passenger in the vehicle based on information obtained through communication with the vehicle V in step S16.

When there is no passenger in the vehicle, the controller 700 enables disinfection in step S18. The controller 700 drives the main motor 110 and the assist motor 540 according to a predetermined command and operates the light sources 330 and 520 for a set driving time to perform disinfection in step S20.

After performing disinfection according to the predetermined command, the controller 700 exits the disinfection mode, and the disinfection is terminated in step S22.

As is apparent from the above description, various aspects of the present disclosure are directed to providing the following effects.

According to an exemplary embodiment of the present disclosure, a disinfection device having improved disinfection performance is provided.

According to an exemplary embodiment of the present disclosure, a disinfection device capable of disinfecting the inside of a specific space in all directions is provided.

According to an exemplary embodiment of the present disclosure, there is provided a disinfection device capable of removing bacteria which may be transmitted by human hands.

According to an exemplary embodiment of the present disclosure, because it is possible to change the irradiation angle of the disinfection light source, the effect of the light source may be maximized.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A disinfection apparatus comprising:
    at least two disinfection units movable into an unfolded position the at least two disinfection units including a first disinfection unit and a second disinfection unit, each including a light source for disinfection; and
    a base coupled to the at least two disinfection units and configured to provide a moving force to the at least two disinfection units,
    wherein the base includes:

a main motor;
a rotation gear engaged to the main motor and providing the first disinfection unit with a rotation force transmitted by the main motor; and
a connecting rod coupling the main motor and the second disinfection unit and providing the second disinfection unit with the rotation force transmitted by the main motor.

2. The disinfection apparatus of claim 1,
wherein the unfolded position is one of a plurality of unfolded positions, and
wherein the disinfection by the light source is performed at each of the unfolded positions.

3. The disinfection apparatus of claim 1, wherein the first disinfection unit is configured to slide to move to the unfolded position.

4. The disinfection apparatus of claim 3, wherein the first disinfection unit is configured to rotate after sliding.

5. The disinfection apparatus of claim 1, wherein the second disinfection unit is configured to rotate to move to the unfolded position.

6. The disinfection apparatus of claim 1, further including a main gear coupled to a rotation shaft of the main motor,
wherein the rotation force of the main motor is transmitted by a belt, the belt being mounted on a circumference of the main gear and configured to rotate together with the main gear.

7. The disinfection apparatus of claim 6, further including a first cooperative gear disposed on a first side of the belt and configured to receive a rotation force of the belt and transmit the rotation force of the belt to the rotation gear.

8. The disinfection apparatus of claim 7, further including a second cooperative gear disposed on a second side of the belt and configured to receive the rotation force of the belt and transmit the rotation force of the belt to the connecting rod.

9. The disinfection apparatus of claim 1, wherein the first disinfection unit includes a housing disposed to be in contact with the rotation gear and movable with respect to a frame coupled to the base.

10. The disinfection apparatus of claim 9, wherein the housing includes a guide in contact with the rotation gear.

11. The disinfection apparatus of claim 10, wherein the frame has a slot formed in a moving direction of the housing, and the housing includes a guide pin guided by the slot.

12. The disinfection apparatus of claim 11,
wherein the housing has a curved portion formed at one side of the guide, and
wherein the curved portion enables the housing to rotate about the guide pin.

13. The disinfection apparatus of claim 9, wherein the second disinfection unit includes a case connected to a second end portion of the connecting rod and configured to be rotatable about a first end portion of the connecting rod.

14. The disinfection apparatus of claim 13,
wherein the case includes an assist gear and an assist motor, and
wherein the assist gear is rotatable along a perimeter of the second end portion, and the assist motor is configured to provide a rotation force to the assist gear.

15. The disinfection apparatus of claim 1, wherein the first disinfection unit includes a first heat dissipation structure and the second disinfection unit includes a second heat dissipation structure.

16. The disinfection apparatus of claim 15,
wherein the first disinfection unit is superimposed on the base and the second disinfection unit is superimposed on the first disinfection unit, and
wherein the first heat dissipation structure and the second heat dissipation structure are formed to engage with each other.

17. The disinfection apparatus of claim 1, wherein the disinfection apparatus is mounted inside a vehicle.

18. The disinfection apparatus of claim 17, wherein the disinfection apparatus is mounted on a headrest of a seat in the vehicle or a roof portion of the vehicle.

19. The disinfection apparatus of claim 17, further including:
a controller configured to control an operation of the disinfection apparatus,
wherein the controller is configured to determine whether there is a passenger in the vehicle, and to perform control of the disinfection apparatus to perform the disinfection by the disinfection apparatus for a predetermined time period when there is no passenger.

* * * * *